(12) United States Patent
Zhang et al.

(10) Patent No.: US 7,039,116 B1
(45) Date of Patent: May 2, 2006

(54) METHODS AND APPARATUS FOR EMBEDDING AND FORMAT CONVERSION OF COMPRESSED VIDEO DATA

(75) Inventors: Ji Zhang, San Jose, CA (US); Humphrey Liu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 674 days.

(21) Appl. No.: 09/708,163

(22) Filed: Nov. 7, 2000

(51) Int. Cl.
*H04N 7/12* (2006.01)

(52) U.S. Cl. .................. 375/240.26; 709/247; 348/441
(58) Field of Classification Search ............ 375/240.26, 375/240.28, 240.01, 240.16; 348/441, 454, 348/458, 512; 382/100, 243; 370/257, 328; 709/247

See application file for complete search history.

(56) References Cited

U.S. PATENT DOCUMENTS

| | | | | |
|---|---|---|---|---|
| 5,467,139 | A * | 11/1995 | Lankford | 348/512 |
| 5,577,042 | A * | 11/1996 | McGraw et al. | 370/257 |
| 5,729,535 | A * | 3/1998 | Rostoker et al. | 370/328 |
| 5,768,535 | A * | 6/1998 | Chaddha et al. | 709/247 |
| 6,507,618 | B1 * | 1/2003 | Wee et al. | 375/240.16 |
| 6,553,150 | B1 * | 4/2003 | Wee et al. | 382/243 |
| 6,553,566 | B1 * | 4/2003 | Grant et al. | 725/28 |
| 6,687,384 | B1 * | 2/2004 | Isnardi | 382/100 |

* cited by examiner

*Primary Examiner*—Gims Philippe
(74) *Attorney, Agent, or Firm*—Beyer Weaver & Thomas, LLP

(57) ABSTRACT

System and methods are provided for modifying a compressed video data stream to match the available video decoding capability of a target decoder. Compressed video content can be embedded in another compressed bitstream to allow more efficient usage of available channel bandwidth. Format conversion allows flexible transmission of video content even if the original format and available decompression capabilities are mismatched.

33 Claims, 10 Drawing Sheets

METHODS AND APPARATUS FOR EMBEDDING AND FORMAT CONVERSION OF COMPRESSED VIDEO DATA

BACKGROUND OF THE INVENTION

The present invention relates generally to systems and methods for transmitting data. More specifically, the present invention relates to systems and methods for embedding compressed digital video data in a bitstream, potentially containing additional compressed digital video data of a different compression format, and transmitting the bitstream over communication channels.

Video services and programs are provided by a spectrum of different video content suppliers. For example, residential digital video services may include digital television, video OnDemand, Internet video, etc.—each service having hundreds of programs. A set-top box (STB) located in a residential home receives video services and programs from a number of different video content suppliers via assorted transmission channels. Transmission channels such as coaxial cable distribution networks, digital subscriber loop (DSL) access networks, ATM networks, satellite, or wireless digital transmission facilities are all well known. Preferably, all digital video programs provided by video content suppliers are available for all residential users.

Since transmission of video data with existing communication channels often requires excessive bandwidth, compression is an approach that has been used to make digital video images more transportable. Digital video compression formats allow digitized video frames to be represented digitally in much more efficient manner. Compression of digital video makes it practical to transmit the compressed signal using digital channels at a fraction of the bandwidth required to transmit the original signal without compression. There is an abundant number of proprietary and public video data compression formats currently in use. Popular proprietary video compression formats include the Microsoft streaming format, QuickTime, RealNetworks, etc. Public video data compression formats include numerous international standards built upon video data compression schemes such as MPEG-1, MPEG-2, MPEG-4, H.261, H.262, H.263, H.263+, wavelet, fractal, etc.

These standardized and proprietary compression formats rely on several algorithm schemes to compress the video data. The MPEG-2 standard, for example, includes motion compensated transform coding (for example, DCT transforms or wavelet/sub-band transforms), quantization of the transform coefficients, and variable length coding (VLC). The motion compensated encoding removes the temporally redundant information inherent in video sequences. The transform coding enables orthogonal spatial frequency representation of spatial domain video signals. Quantization of the transformed coefficients reduces the number of levels required to represent a given digitized video. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality.

A bitstream refers to a continuous sequence of binary bits used to digitally represent compressed video, audio or computer data. The system that is used to compress digitized video data in an uncompressed bitstream using a compression scheme is called an encoder or encoding apparatus. The system that is used to decompress a video bitstream using the reverse schemes is called a decoder or decoding apparatus. In the above example of a set-top box (STB) located in a residential home, the set-top box is typically installed with a static decoding capability. More specifically, the set-top box only decodes video content according to the video decompression formats that the set-top box hardware and software are initially configured to manage. Any video content outside of the established decoding capability of the set-top box results in inaccessible video content services and programs for the residential user. Video content and programs refer to compressed video data transmitted by a network source or supplier for reception, decompression and viewing by an end-user.

Currently, there is no synchronization between video content suppliers with respect to which video compression format is to be globally used. As the decompression capability of the residential user is typically static, the burden of facing the kaleidoscope of public and proprietary video compression formats must then be overcome at some point between the video content suppliers and the residential user. The decompression burden becomes more unruly when residential users carry different decoding capabilities. Different decoding capabilities are common when different local cable companies supplying the set-top boxes implement different decoding capabilities, or when a set-top box strictly includes proprietary decoding capabilities—at the expense of other proprietary and public decoding capabilities. Also, it is important to point out that compressed video bitstreams are usually generated by video content providers using either real-time encoders or pre-compressed video server storage systems. Both are likely to be in a remote site, away from the network and end-user. This increases the difficulty in encoding the video signal with a format suitable or tailored to the decoding capability of an end-user.

In addition to format incompatibility problems between video content suppliers and end-users, modern video service also includes multiple programs to be simultaneously received by the end-user. The multiple video programs may often be too large for the available bandwidth on the channels used to transmit the programs from the suppliers to the users. Overloading the available bandwidth may lead to degradation in transmission quality or unavailability of programs to end-users.

Based on the foregoing, it should be evident that there is a need for methods and systems of providing compressed digital video content over data channels that fit within the available bandwidth and that comply with an end-user's decoding capability.

SUMMARY OF THE INVENTION

The present invention overcomes the deficiencies and limitations of the prior art with systems and methods for embedding and/or format conversion of compressed video data to match the available video decoding capability of a target decoder. The present invention also allows video content embedding of one or more compressed video data in another compressed bitstream to better use available channel bandwidth between a video content supplier and a target decoder. Embedding may be further advantageous for target digital receiver/decoders having multiple format decompression capabilities. This may allow target digital receiver/decoders having multiple format decompression capabilities to decompress the multiple compressed video bitstreams simultaneously. The present invention may also include format conversion of the video content based on the available video decoding capability of a target decoder. Format conversion allows flexible transmission of video content even when the original video data format and available decompression capability are mismatched.

In one aspect, the invention relates to a network device for providing first compressed video data onto a network. The network device comprises an embedder apparatus having a first embedder portion which embeds first compressed video data having a first compressed format in a transmission bitstream having a second compressed format. The network device also comprises a transmitter that transmits the transmission bitstream having the second compressed format, the transmission bitstream including the first compressed video data having the first compressed format.

In another aspect, the invention relates to a network device for providing compressed video data onto a network. The network device comprises a compressed format converter that receives first compressed video data having a first compressed format and outputs the first compressed video data having a second compressed format. The network device also comprises an embedder which receives the first compressed video data and second compressed video data and embeds one of the first compressed video data and second compressed video data into the other of the first compressed video data and second compressed video data. The network device further comprises a transmitter configured to transmit the first and second compressed video data.

In yet another aspect, the invention relates to a method for providing compressed video data. The method comprises embedding compressed video data having a first compressed format in a transmission bitstream having a second compressed format. The method also comprises transmitting the transmission bitstream having the second compressed format and containing the compressed video data.

In still another aspect, the invention relates to a network device for transmitting compressed video data. The network device comprises means for receiving the compressed video data in a first compressed format. The network device further comprises means for converting the compressed video data from the first compressed format to a second compressed format. The network device also comprises means for embedding the compressed video data having the second compressed format in a transmission bitstream having a third compressed format. The network device additionally comprises means for transmitting the transmission bitstream having the third compressed format, the transmission bitstream including the compressed video data having the second compressed format.

In another aspect, the invention relates to a computer readable medium including instructions for method for providing compressed video data. The instructions comprising instructions for embedding compressed video data having a first compressed format in a transmission bitstream having a second compressed format. The instruction further comprising instructions for transmitting the transmission bitstream having the second compressed format and containing the compressed video data.

These and other features and advantages of the present invention will be described in the following description of the invention and associated Figures.

DETAILED DESCRIPTION OF THE PREFERRED EMBODIMENTS

Figure 1:
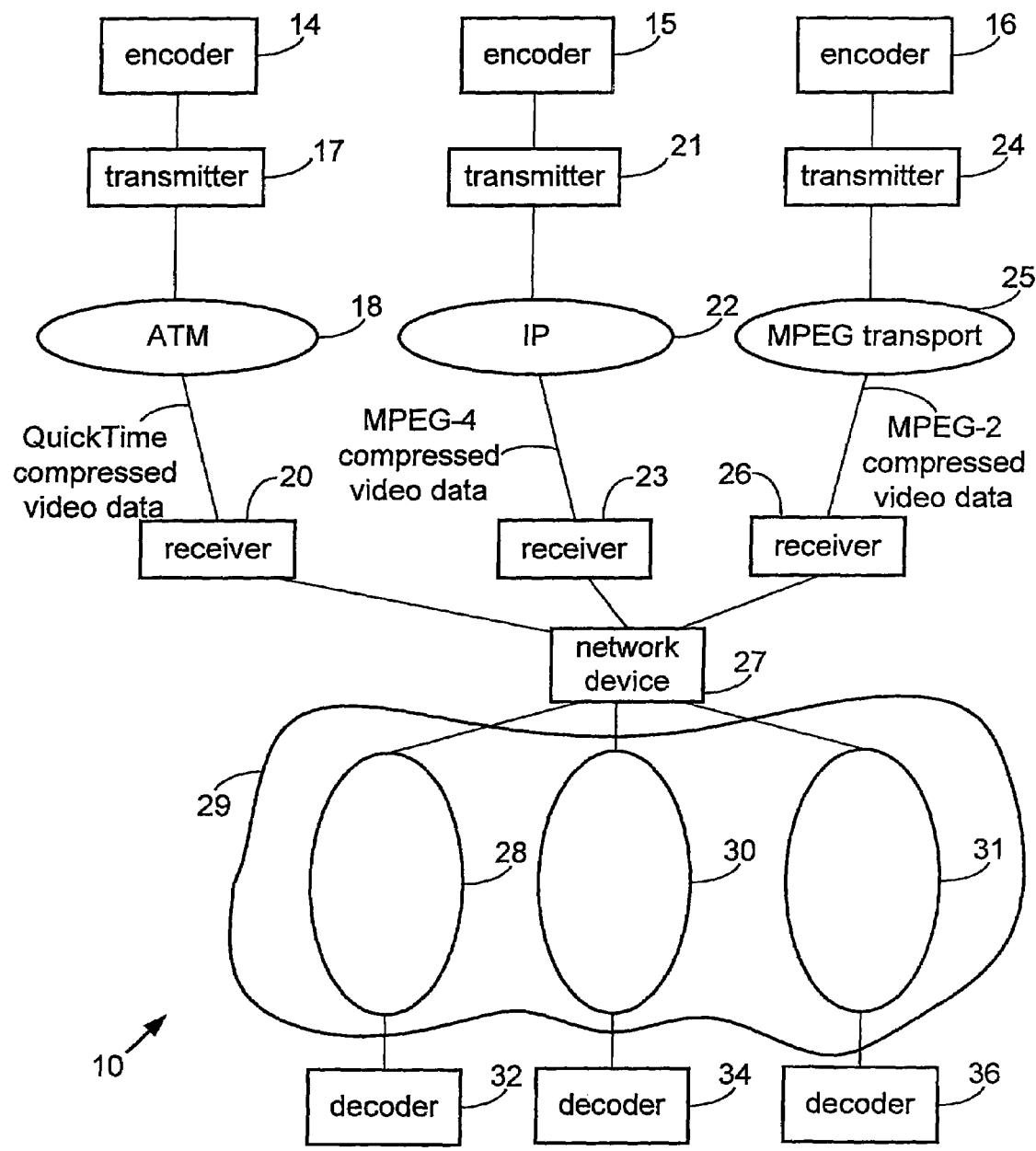
FIG. 1 illustrates a system where format conversion and compressed video data embedding of the present invention is particularly advantageous is described in accordance with one embodiment of the present invention.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In some instances, well known process steps and/or structures have not been described in detail in order to not unnecessarily obscure the present invention.

In some multimedia delivery systems, compressed video programs are delivered to a target digital receiver/decoder from numerous video program suppliers via one or more digital transmission channels. Each of the programs may be carried within bitstreams having a different video compression format. In such situations, the target digital receiver/decoder, which has a static decompression capability based on installation or most recent upgrade, must be able to decode the video content regardless of the compression format used to transmit the video content. In these cases, the present invention may apply format conversion to an originally compressed video bitstream so that the format of the compressed video data matches the decompression capability of the target digital receiver/decoder.

In addition to format conversion to improve end-user compressed video data service, the present invention may also combine multiple compressed video bitstreams into a single bitstream. Embedding video data in this manner may reduce the total bit rate of the video data and may be advantageous for target digital receiver/decoders limited in their service by low upstream channel bandwidth. Embedding may be further advantageous for target digital receiver/decoders having multiple format decompression capabilities. As the decompression capabilities of the target digital receiver/decoders are usually known at some point in network transmission of the video content, the multiple compressed video bitstreams may be combined based on the decompression capabilities of the target decoder. This may allow target digital receiver/decoders having multiple format decompression capabilities to decompress the multiple compressed video bitstreams simultaneously.

The multiple compressed video bitstreams are combined by embedding one compressed video bitstream into a second compressed video bitstream that is to be transmitted—referred to herein as a 'transmission bitstream'. Upon receiving the transmission bitstream including the multiple compressed video data, each bitstream having a different format may be processed separately to expedite decompression of the multiple bitstreams, or to provide simultaneous multiple video content reception. Each of the compressed video bitstreams combined into the transmission bitstream may be format converted to comply with the known decompression capabilities of the target digital receiver/decoder.

The invention relates to a set of network devices. In one embodiment, each of the network devices is adapted to convert an incoming compressed bitstream to a bitstream with a format that is appropriate for a decoder that receives the bitstream. For example, if the incoming compressed bitstream contains video data in a QuickTime format, and the target decoder is solely capable of decompressing MPEG-2, the network device converts the original compressed video data to have a format that matches the decoder capability, namely MPEG-2. Similarly, if a second decoder solely has a wavelet decompression capability, the network device converts the original compressed QuickTime bitstream to have a format that matches the decoder capability, namely wavelet.

In another embodiment, a set of network devices is adapted to embed one or more incoming compressed video bitstreams into a single bitstream to be transmitted to the target decoder. For example, if two incoming compressed video bitstreams have an MPEG-4 format and an MPEG-2 format, respectively, and a targeted decoder is capable of MPEG-2 and MPEG-4 decompression, the network device may embed the MPEG-4 compressed video bitstream into the MPEG-2 compressed video bitstream. The resulting combined bitstream is then transmitted from the network device to the target decoder where the video content in each format may be separated, separately decompressed, and provided to the user. In addition, if one or more incoming compressed video bitstreams do not match the decompression capabilities of the target decoder, then the one or more incoming compressed video bitstreams may be format converted to match the decompression capabilities of a targeted decoder—before combining into a single bitstream. For example, if two incoming compressed video bitstreams have a QuickTime format and an MPEG-2 format respectively, and a targeted decoder is capable of MPEG-2 and MPEG-4 decompression, the network device may convert the QuickTime compressed video bitstream into an MPEG-4 compressed video bitstream before embedding it into the MPEG-2 compressed video bitstream. The resulting combined bitstream is then transmitted from the network device to the target decoder where the video content in each format may be separated and independently decompressed.

Video content embedding and format conversion to the decompression capability of the target digital receiver/decoder results in more robust video content transmission, regardless of video content supplier compression format and end-user decompression capability. This allows end-users to receive video content regardless of their decompression capabilities and improves video content reception flexibility. Video content embedding also allows improved use of limited channel bandwidth between video content suppliers and end users. Format conversion according to the present invention also advantageously permits video content suppliers to reach end-users normally inaccessible due to a compressed video format incompatibility.

The present invention relates to compressed video data transmission on communication channels, and for the purposes of the present application a channel is defined broadly as a connection facility to convey properly formatted digital information from one point to another. A channel may include some or all of the following elements: 1) physical devices that generate and receive the signals (modulator/demodulator); 2) medium that carries the actual signals; 3) mathematical schemes used to encode and decode the signals; 4) proper communication protocols used to establish, maintain and manage the connection created by the channel; 5) storage systems used to store the signals such as magnetic tapes and optical disks. The concept of a channel includes but is not limited to a physical channel, but also logical connections established on top of different network protocols, such as xDSL, ATM, IP, wireless, HFC, coaxial cable, Ethernet, Token Ring, etc.

The channel is used to transport a bitstream, or a continuous sequence of binary bits used to digitally represent compressed video, audio or data. The bit rate is the number of bits per second that the channel is able to transport. A multiplex is a scheme used to combine bitstream representations of different signals, such as audio, video, or data, into a single bitstream representation. A remultiplex is a scheme used to combine bitstream representations of different multiplexed signals into a single bitstream representation.

One particular communication channel that is becoming increasingly common is the cable modem channel, such as that defined by the DOCSIS cable modem standard by CableLabs and the DAVIC cable modem standard by DVB. In DOCSIS based cable data networks, operators and digital service providers use the radio frequency spectrum in the coaxial cable network to deliver digital data signal in a 6 MHz frequency slot. The aggregate data bit rate capacity of the slot may be shared by multiple, possibly different, types of information services. Cable modem service is one such information service that allows service operators to provide a number of two-way interactive digital services to end-users. One particular digital service delivers a compressed digital video signal for video streaming or video on demand.

Another particular communication channel that is becoming increasingly common is networks running on IP and/or Asynchronous Transfer Mode (ATM) network protocols. Both network protocols are based on different transport protocols that can be used to transport data or multimedia bitstreams with a pre-specified quality of service. For example, ATM protocol specifies how data is first packetized into fixed sized data units, called cells. It also specifies how such a cell stream can be multiplexed, de-multiplexed, switched and routed between different locations to support end-to-end connections at given bit rate and/or quality of service (QOS).

In another communication channel example, integrated services (IntServ), differential services (DiffServ), and Multiple Protocol Label Switch (MPLS) are used to establish a QOS for different network traffic. These services may use the Common Open Policy Service (COPS) for admission control. Internet Group Management Protocol (IGMP) and a variety of multicast routing protocols are also used to establish and tear down service on a multicast tree, which is commonly used for video transmission. Strictly speaking, these QOS protocols are an additional layer of protocol on top of IP protocol. Therefore, they are not examples of communication channels themselves, but an additional attribute of other communication channels that support IP protocol.

In embodiment, the present invention converts the format of compressed video data to comply with the allowable decompression capability of a targeted decoder. This allows flexible transmission of video content even when the original video data format provided by the central office, streaming server or network device transmitting the video content and available decompression capability of the target decoder are mismatched. The present invention is also suitable for flexible video content combining of multiple compressed video bitstreams by embedding first compressed video data into a bitstream having second compressed video data. Referring now to FIG. 1, a system where format conversion and compressed video data embedding of the present invention is particularly advantageous will be described.

FIG. 1 illustrates a system 10 for transmitting multiple compressed bitstreams including compressed video data to target decoders 32, 34 and 36 in accordance with one embodiment of the present invention. The multiple compressed video data bitstreams are produced by encoders 14, 15 and 16, each of which produce a compressed bitstream including video data having a different compression format. The encoder 14 receives uncompressed video data and compresses the video data to provide compressed video data having a first format, namely QuickTime. The QuickTime compressed video data is then received by the transmitter 17 and output over a medium 18. The transmitter 17 can be any one of a variety of those known in the art for DSL networks, for example. In a specific embodiment, the communication path is a ATM based communication system where the transmitter 17 transmits the QuickTime compressed video data to receiver 20.

The encoder 15 receives uncompressed video data and compresses the video data to provide compressed video data having a second format, namely MPEG-4. The MPEG-4 compressed video data is then received by the transmitter 21 and output over a medium 22. The transmitter 21 can be any one of a variety of those known in the art for IP networks, for example. In a specific embodiment, the medium 22 is an Internet network where the transmitter 21 transmits through a series of nodes which route the MPEG-4 compressed video data to a receiver 23.

The encoder 16 receives compressed video data in a proprietary format such as Microsoft streaming, decompresses the compressed video data (decoder not shown in FIG. 1), and re-encodes the video data to provide compressed video data having a third format, namely MPEG-2. For purposes herein, 're-encoding' refers to the process of performing decoding and then encoding to a compressed bitstream, either fully or partially, and with the same or a different format. Re-encoding is also commonly referred to as 'recoding' or 'transcoding'. The MPEG-2 compressed video data is then received by the transmitter 24 and output over a medium 25. The transmitter 24 can be any one of a variety of those known in the art, for example. In a specific embodiment, the medium 25 is a coaxial cable network where the transmitter 21 transmits the MPEG-2 compressed video data to a receiver 26 according to the digital video broadcast (DVB) specification.

The compressed video bitstreams sent over the mediums 18, 22 and 25 are received by their respective receivers 20, 23 and 26 and input to the network device 27. Based on a request one or more of the target decoders 32, 34 and 36, the network device 27 transmits any one or a combination of the compressed bitstreams. For example, the target decoder 32 receives compressed video data from the network device 27 through a local network 28. The local network 28 is included in a larger network 29 that also includes local networks 30 and 31, which service the target decoders 34 and 36, respectively. In one embodiment, the encoder 14 is a central office, the network device 27 is a headend and the local network 28 corresponds to a geographic service area of a cable network serviced by the headed. The decoder 32 may then correspond to a decoder included in a set-top box or personal computer located in a residential home. The decoder 32 decompresses the compressed video data into an uncompressed format for visual presentation to the user.

The system 10 is suitable for flexible video content transmission to the decoders 32, 34 and 36. Typically, the network device 27 is aware of the decompression capability of a target decoder that it transmits to. In some cases, the network device 27 may convert the format of one or more compressed video bitstreams received from one of the encoders 14, 15 and 16 before transmitting the converted video data to one of the target decoders 32, 34 and 36. The format conversion of the compressed video data within the network device 27 is based on the decompression capability of the target decoder. In addition, the network device 27 may embed one or more compressed video bitstreams received from one of the encoders 14, 15 and 16 into another of the compressed video bitstreams received from one of the encoders 14, 15 and 16.

The decompression capability determines which compressed video data formats may be decompressed by each of the target decoders 32, 34 and 36. In this case, each of the target decoders 32, 34 and 36 include the same decompression capability, namely MPEG-2 and MPEG-4. The present invention allows compressed video data of any format received by the network device 27 to be transmitted to any of the target decoders 32, 34 and 36 as compressed video data having an MPEG-2 and/or MPEG-4 format. The network device 27 may also combine multiple compressed video bitstreams before transmission to the decoders 32, 34 and 36. It should also be noted that each target decoder may also include additional decompression capability not included in the other decoders. By way of example, the decoder 32 may be a set-top box only capable of MPEG-2 and MPEG-4 decompression while the decoder 36 may be included in a personal computer including software that allows for MPEG-2 and MPEG-4 decompression as well as decompression of several proprietary compression formats. Typically, the target decoder will specify what video content it is to receive in addition to what digital video compression formats it can handle. For multiple video content requested by the target decoder, the network device 27 may combine compressed video bitstreams accordingly.

For example, the decoder 32 requests the video programs provided by encoders 15 and 16. The network device 27 receives the compressed MPEG-4 and MPEG-2 video data provided by the encoders 15 and 16, respectively, and embeds the compressed MPEG-4 video data into the compressed MPEG-2 bitstream. The network device 27 transmits the compressed MPEG-2 bitstream including the compressed MPEG-4 video data to the decoder 32. The decoder 34 requests the video content provided by encoder 14. The network device 27 receives the compressed QuickTime video data provided by the encoder 14 and converts the compressed QuickTime bitstream into a compressed MPEG-2 bitstream. The network device 27 then transmits the converted compressed MPEG-2 bitstream to the decoder 34. The decoder 36 requests the video content provided by encoders 14, 15 and 16. The network device 27 receives the compressed QuickTime, MPEG-4 and MPEG-2 video data provided by the encoders 14, 15 and 16, respectively, and converts the compressed QuickTime bitstream into a compressed MPEG-4 bitstream. The network device 27 then embeds both the compressed MPEG-4 video data provided from encoder 15 and the compressed MPEG-4 video data converted from the compressed QuickTime bitstream into the compressed MPEG-2 bitstream generated by encoder 16. The network device 27 transmits the compressed MPEG-2 bitstream including both compressed MPEG-4 bitstreams to the decoder 36.

Figure 2:
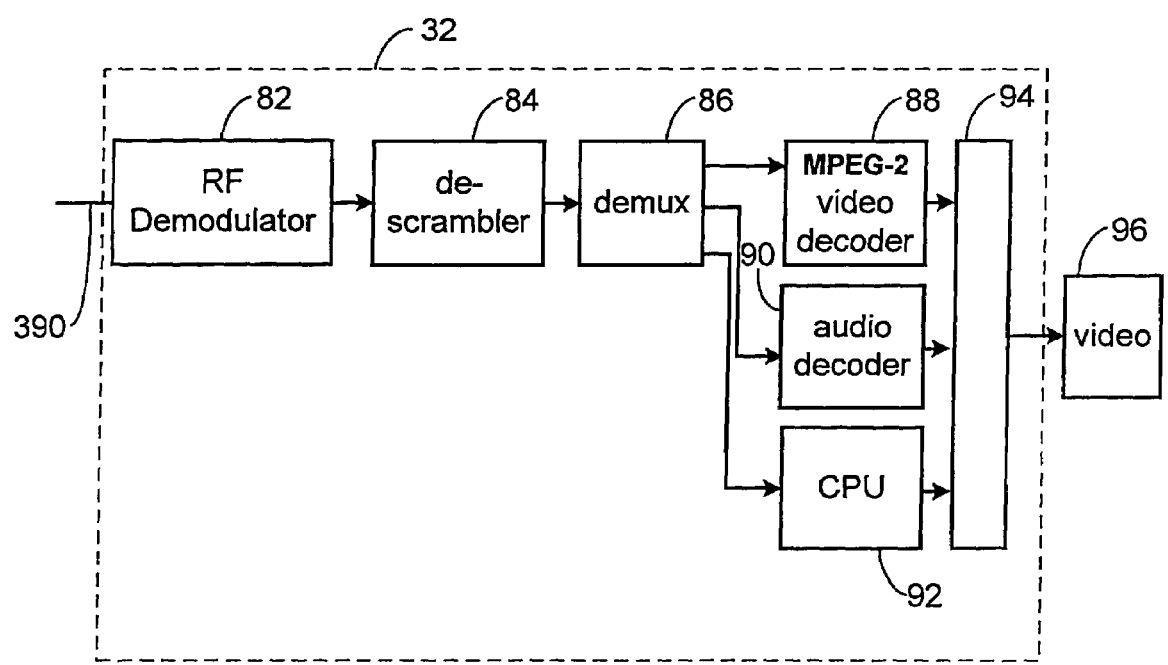
FIG. 2 is a high-level block diagram of the decoder of FIG. 1 in accordance with one embodiment of the present invention.

FIG. 2 is a high-level block diagram of the decoder 32 of FIG. 1 in accordance with one embodiment of the present invention. The decoder 32 is responsible for receiving the compressed transmission bitstream produced by the network device 27, decompressing the transmission bitstream and providing video output corresponding to the video data in the compressed video bitstream. The decoder 32 includes an RF demodulator 82 for converting any incoming analog signals (e.g. an incoming RF signal) to digital. A descrambler 84 descrambles the digital signal before sending it to a demultiplexer 86. The demultiplexer 86 separates the incoming compressed bitstream into its respective compressed audio, video and data streams according to processing capability of the decoder 32.

To achieve decompression of the incoming compressed data, the decoder 32 includes a set of decompression processors—namely an MPEG-2 video decoder 88, an audio decoder 90 and a CPU 92. The CPU 92 includes decompression software capable of decompressing one or more public and/or proprietary compression formats, e.g., wavelet, MPEG-4 and H.263. The demultiplexer 86 is aware of decompression capability of the decompression processors 88, 90 and 92 and sends compressed data in the incoming digital signal to the appropriate decompression processor. After decompression of the compressed video data, a graphic processor 94 provides visual output of video data to a visual output 96. The decompression processors 88 and 92 may simultaneously decompress video content sent to them by the demultiplexer 86. Advantageously, this simultaneous processing allows for expeditious decompression of incoming video content and also allows the visual output 96 to provide simultaneous display of multiple incoming video content. It should be noted that, in some cases, the incoming compressed bitstream sent by the network device 27 of FIG. 1 may contain video content having a format outside of the decompression capability of the decoder 32. This video content is simply dropped by the demultiplexer 86.

The present invention allows flexible transmission of compressed video data even when the original compressed video data format and available decompression capabilities are mismatched. In some cases, the transmission of compressed video data may include combining compressed video data from multiple sources. Both these functions may be handled by a network device encountered anywhere in transmission between the video content supplier of the compressed video data and the target receiver/decoder.

Figure 3A:
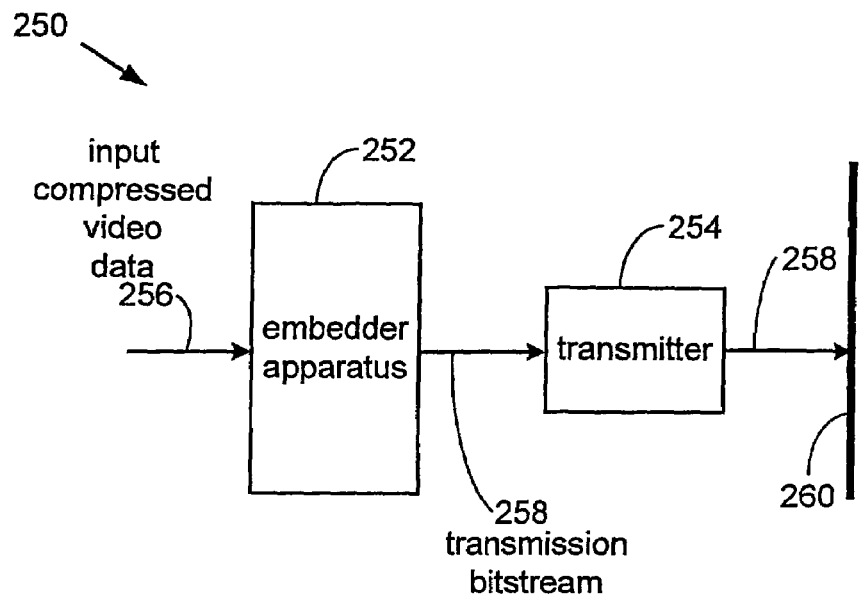
FIG. 3A is a high level block diagram of a system which embeds compressed video data having a first compressed video data format in a transmission bitstream having a second compressed video data format in accordance with one embodiment of the present invention.

FIG. 3A is a high level block diagram of a system 250 which embeds compressed video data having a first compressed video data format in a transmission bitstream including second compressed video data having a second compressed format in accordance with one embodiment of the present invention. The system 250 comprises an embedder apparatus 252 and a transmitter 254. The embedder apparatus 252 is coupled to receive an input signal 256 that includes compressed video data having the first compressed video data format, e.g. a broadcast movie compressed in MPEG-4. The embedder apparatus 252 embeds the compressed video data 256 into a transmission bitstream 258. The transmission bitstream 258 may be obtained through a second input to the embedder apparatus 252 or may be produced by the embedder apparatus 252.

The transmission bitstream may comply with any suitable audio, video or data transport format. In one embodiment, the transmission bitstream is an MPEG-2 transmission bitstream and the first compressed video data is embedded as a data structure in the private user data field of the MPEG-2 transmission bitstream. In a specific embodiment, the first compressed video data is inserted into the elementary stream of the MPEG-2 transmission bitstream just before the picture data fields. In this case, the compressed video transmission bitstream 258 is compliant to the MPEG-2 standard and may be either produced by the embedder apparatus 252 or as a separate bitstream received by another input into the embedder apparatus 252. It should be noted that the transmission bitstream need not be provided with its own audio, video or data content before embedding of the compressed video data 256, e.g. the transmission bitstream is a carrier. For example, the compressed video data 256 may be embedded into the transport stream of an MPEG-2 signal that does not include its own video data.

The embedder apparatus 252 outputs the transmission bitstream 258 having a second compressed video data format and including the first compressed video data. This bitstream 258 is then received by the transmitter 254 that transmits the transmission bitstream 258 onto a network 260. The encoder portion 252 may be a single hardware and/or software structure or multiple hardware and/or software structures. In one embodiment, the encoder apparatus 252 implements ASIC hardware. In another embodiment where storage based multicasting of pre-encoded content is the application, the encoder apparatus 252 is implemented in software.

Figure 3B:
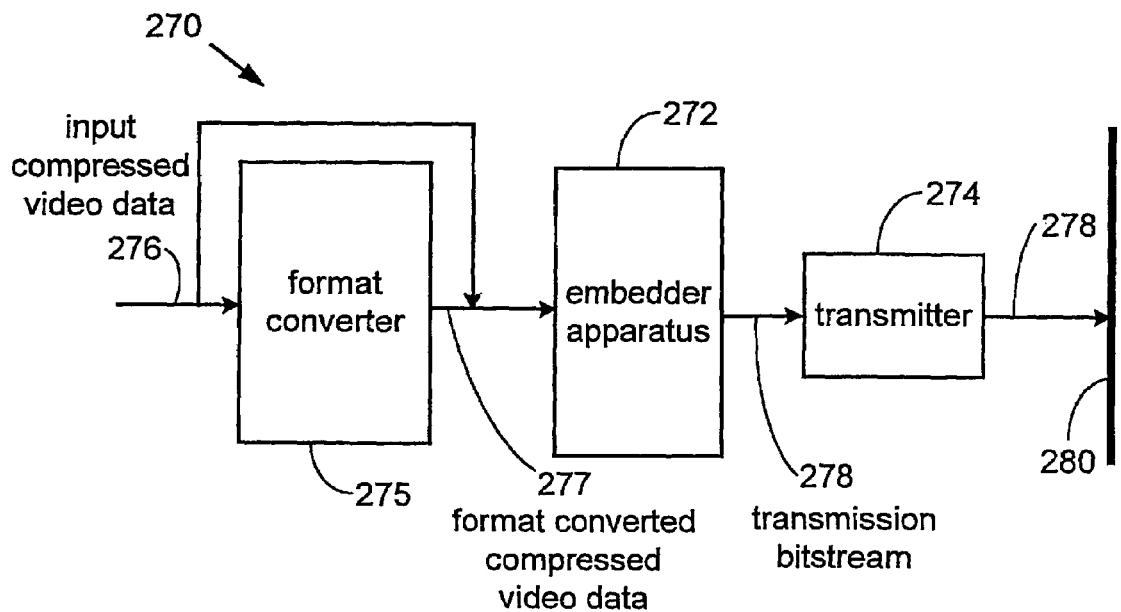
FIG. 3B is a high level block diagram of a system which embeds compressed video data having a first compressed video data format in a transmission bitstream having compressed video data in accordance with another embodiment of the present invention.

FIG. 3B is a high level block diagram of a system 270 which embeds compressed video data having a first compressed video data format in a transmission bitstream having compressed video data in accordance with another embodiment of the present invention. The system 270 is also suitable for converting the compression format of one or more of the incoming bitstreams including video data. The system 270 comprises an embedder apparatus 272, a format converter 275 and a transmitter 274. The embedder apparatus 272 is coupled to receive an input signal 276 including compressed video data.

Depending on the format of the compressed video data received on the input signal 276 and the decompression capability of the target decoder, the embedder apparatus 272 either directly receives the input signal 276 or a format converted version of the compressed video data as output by the format converter 275. More specifically, if the format of the compressed video data received from the input signal 276 is not suitable for the target decoder that the video data is to be transmitted to by the transmitter 274, the compressed video data may be format converted by the format converter 275. In one embodiment, the target decoder has a static decompression capability established during initial implementation of the decoder that the format converter 275 is aware of, e.g., when the target decoder is deployed by a cable company that provides the same decoder for a geographic area. In another embodiment, an initial handshake between the target decoder and the system 270 includes information relating to the decompression capability of the target decoder. When required, the format converter 275 outputs compressed video bitstream having a compressed video data format suitable for decoding by the target decoder. This compressed video bitstream is sent to the embedder apparatus 272 which embeds the compressed video data having a suitable format into the transmission bitstream 278.

The transmission bitstream 278 is then received by the transmitter 274 and transmitted onto a communications channel 280 to the target decoder. The communications channel 280 may include any of a number of conventional transmission systems, including but not limited to xDSL, ATM/ADSL, ATM, ISDN links, Ethernets, public data networks, T1, T3, DS-3, OC-3, wireless/terrestrial networks, digital satellites, and digital cable networks, and particular ones are described below. The network device may be a central office, router, or a headend as described with respect to FIG. 1, for example. In one embodiment, the compressed video data is transmitted in real-time by a network device. The network device embeds any requested compressed video bitstreams into the transmission bitstream 278. In addition, the network device may convert the compression format of any one or more of the compressed video bitstreams embedded in the transmission bitstream 278 corresponding to the decompression capabilities of the target receiver/decoder.

Although the systems 250 and 270 describe embedding and format conversion of only one compressed video bitstream into the transmission bitstream 278, multiple compressed video bitstreams having multiple formats may be embedded into the transmission bitstream 278 by the embedder apparatus 252 or 272. Based on the available decompression capabilities of the target decoder, the network device may determine which format or formats to use during any format conversion. Format conversion may correspondingly be performed on each compressed video bitstream by the format converter 275, if desirable, before embedding.

In one embodiment where an MPEG-2 bitstream is not received by the system 250 and 270, the embedder apparatus 252 and 272 perform under MPEG-2 and produce an MPEG-2 compliant bitstream. This may include producing either an MPEG-2 transport stream, an MPEG-2 packetized elementary stream (PES) or an MPEG-2 elementary stream. Depending on which format is used, additional processing may be implemented in the embedder apparatus 252 and 272. For simplicity, the following discussion will focus on an elementary stream produced by the encoder apparatus 252 and 272. Transport level and PES processing will include packetization can be described in further detail below.

While the present invention will now be described in the context of cable networks, Digital Subscriber Line networks (DSL), IP networks and ATM networks, those skilled in the art will realize that the present invention is applicable to a variety of other types of communication channels such as any xDSL including ADSL, HDSL, VDSL, SDSL, or any other suitable wireless transmission channels.

Asymmetric Digital Subscriber Loop, or ADSL, is a physical line code modulation scheme for transmitting a digital bitstream over a single pair of plain old telephone system (POTS) grade twisted copper wires, that are usually noisy and are subject to outside interference. Several schemes have been developed to achieve high channel capacity of the twisted copper wires. xDSL systems provide simple or full duplex raw bit pipes between the Central Office (CO) and the remote site receivers. The material content and the format of the bitstream or the protocols used by the connections being established by the bit pipe is immaterial to the xDSL system itself. In ADSL, the downstream link, from central office (CO) to remote site, has higher bandwidth than the upstream direction.

Because broadcast video quality can be achieved with compressed video, such as MPEG-2, at 3–6 Mbps, ADSL provides a useful delivery scheme for compressed digital video and other high speed data connecting COs with remote sites, which can be either consumer subscribers or business establishments. However, because of the variation in physical line conditions due to both the physical distance of the connection and the noise conditions of the lines, the ADSL transmission schemes do not specify channel capacity in either direction, rather the channel capacity is determined at connection set up time via channel initialization and training by the transceivers at the CO location and at the remote locations, in a conventional manner. The initialization and training process determines the proper coding configuration best matched to the current channel condition in order to achieve the maximum channel capacity. During the connection, due to change in line condition or due to loss of data, the transceivers may also re-initialize and retrain to settle on the new coding configuration.

In all the figures and discussions for the present invention, it is important to note that the channels are bi-directional, even though the present invention is described and shown by focusing on a single direction for ease of understanding. The present invention focuses on the transmission in a direction from a central office to a customer as shown in FIG. 1 from the encoder 14 to the decoder 32. In other words, the transmitter device (such as transmitter 17) is also a receiver device in the reverse direction, from the customer to the central office (from decoder 32 to encoder 14 of FIG. 1, for example).

Figure 4:
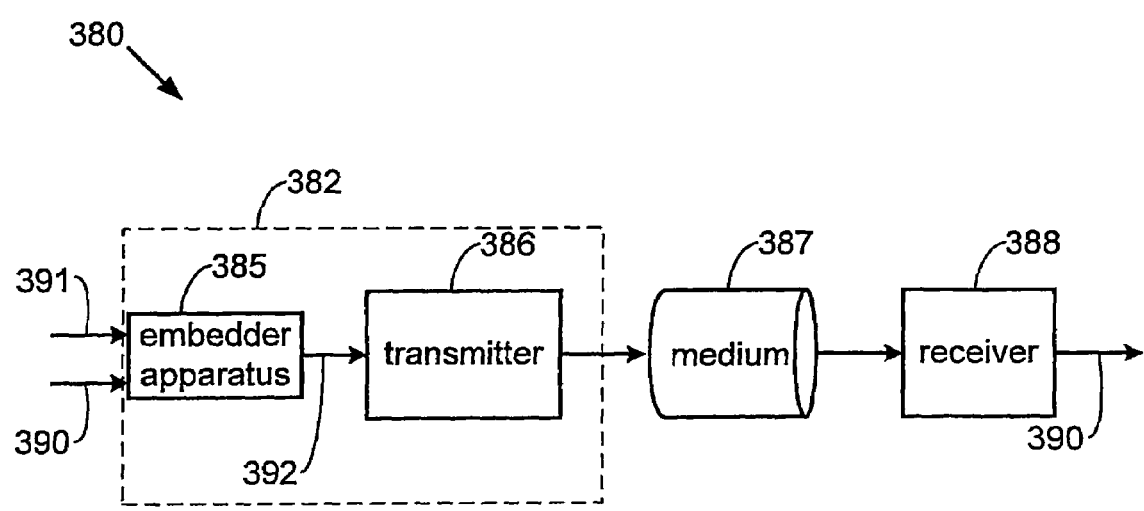
FIG. 4 illustrates a system for transporting compressed digital video data in accordance with one embodiment of the present invention.

Referring now to FIG. 4, a system 380 for transporting compressed digital video data is illustrated in accordance with one embodiment of the present invention. The system 380 comprises a network device 382 having an embedder apparatus 385 and a transmitter 386. The transmitter 386 is coupled by a transmission medium 387 to a receiver 388. The receiver 388 may be included, for example, in another network device or a target decoder. Together, the transmitter 386, the medium 387 and the receiver 388 may act to define a transmission channel as described above.

The network device 382 embeds compressed video data having one or more video compression formats into a transmission bitstream including compressed video data having one of the same or another video compression format. More specifically, the embedder apparatus 385 has multiple inputs coupled to lines 390 and 391 to receive compressed bitstreams of compressed video data. The lines 390 and 391 receive signals from a satellite receiver and an Internet network receiver, respectively. Each of the compressed bitstreams may have the same or different compression formats. In one embodiment, the network device 382 embeds the bitstream received from one of lines 390 and 391 into the other of the bitstreams received from lines 390 and 391. If both of the compressed bitstreams received from the lines 390 and 391 are not MPEG-2 formatted, the network device 382 may include a format converter for converting one of the bitstreams received from lines 390 and 391 to an MPEG-2 compressed bitstream and embed the other compressed bitstream into the MPEG-2 compressed bitstream. Alternatively, the network device 382 may generate an MPEG-2 compressed bitstream and embed both compressed bitstreams received from lines 390 and 391 into the generated MPEG-2 compressed bitstream. In this case, either of the compressed bitstreams received from the lines 390 and 391 may be format converted to a compression format suitable for decompression by a target decoder. The output compressed bitstream of the network device 382 is the transmission bitstream having an MPEG-2 compression format and includes the video content received from the lines 390 and 391.

The output of the network device 382 is coupled by line 392 to the input of the transmitter 386. The output of the transmitter 386 is coupled by the medium 387 to the input of the receiver 388. The medium may be any one of a variety of types, e.g. a frequency band used for wireless communication, a twisted pair or coaxial copper cable, etc. The output of the receiver 388 is coupled to line 394 and provides the output signal that is also a compressed bitstream. As illustrated in FIG. 4, the network device 382 and the transmitter 386 are combined in a single device or software module. In another embodiment, network device 382 and transmitter 386 are separate devices or performed in separate software modules.

Figure 5A:
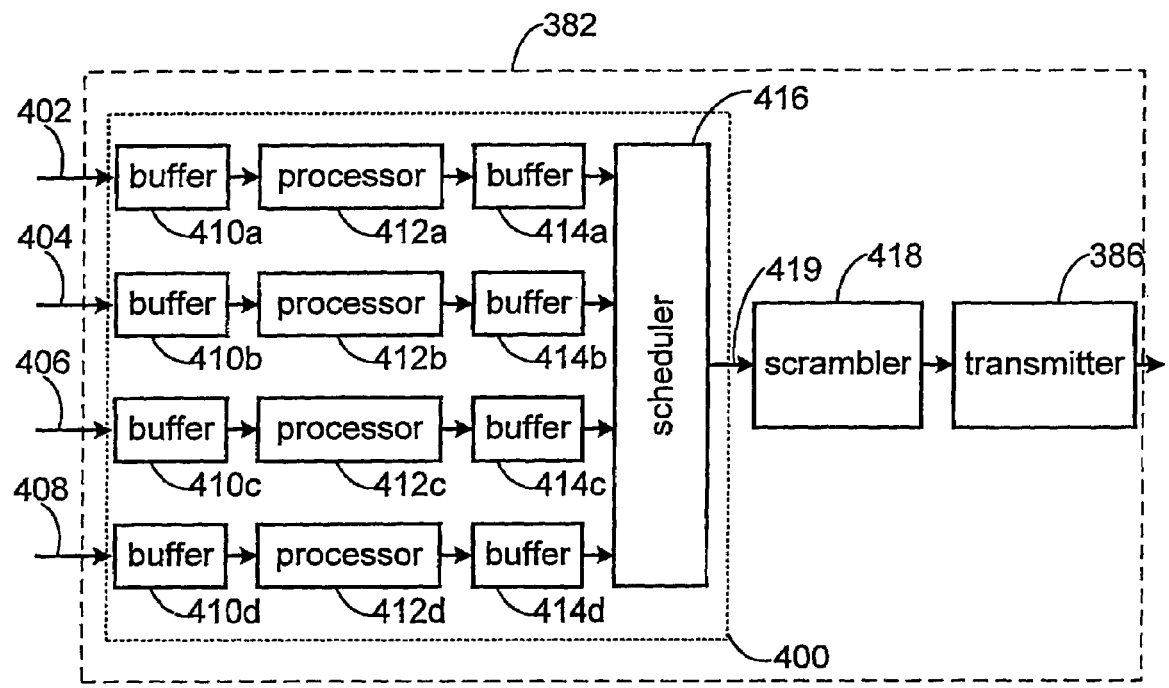
FIG. 5A illustrates the network device of FIG. 4 in more detail in accordance with one embodiment of the present invention.

Referring now to FIG. 5A, the network device 382 of FIG. 4 is shown in more detail in accordance with one embodiment of the present invention. The network device 382 includes a number of processors having embedder portions which embed compressed video data having one or more compressed video data format in a transmission bitstream having a compressed video data format. In addition, the network device 382 includes multiple compressed video data format converters that receive compressed video data having a first compressed video data format and may output the compressed video data having a second compressed video data format.

The network device 382 also transcodes video data. Transcoding generally refers to altering data or information in a compressed bitstream without changing the format of the compressed bitstream.] In some cases, the network device 382 may alter the bit rate of the transmission bitstream based on the bit rate capacity of the channel between the network device 382 and the target decoder. Bit rate conversion of a compressed video bitstream refers to the process performed on modified compressed video bitstreams that results in a different transmission bit rate than the originally compressed bitstream. Additionally, the underlying resolution of the compressed video may also be downconverted during the transcoding operation to further reduce the number of bits required to compress the video content. The bit rate conversion may occur on any one or more of the compressed video bitstreams received by the network device 382 and output in the compressed transmission bitstream. In a typical scenario, the new bit rate for the compressed transmission bitstream including embedded compressed video data is smaller than the original bit rates of the incoming compressed bit streams, but sometimes the resulting bit rate can also be greater than the original bit rates. In other scenarios, the compressed bitstream may be delivered to different transmission channels each having a different channel capacity and the bit rate for each channel may be tailored accordingly. By way of example, two compressed bitstreams received at 4 Mbps and 2 Mbps (total input=6 Mbps) may be converted and embedded by the network device 382 to a compressed transmission bitstream of 1.5 Mbps for a channel capable of delivering only 1.5 Mbps. The same modified compressed bitstreams may also be converted and embedded by the network device 382 to a compressed transmission bitstream of 3 Mbps for a channel capable of delivering only 3 Mbps. In this case, the data and bit rate conversion process is intended to remove bits from the modified compressed bitstreams so that the new bitstreams are still compliant to the given compression syntax, and can be decoded by the receiver, albeit at a possibly lower quality than the originally compressed bitstream. Bit rate conversion of a compressed video bitstream is further described in commonly owned co-pending U.S. patent application entitled "A System and Method for Transporting Compressed Video and Data Bit Stream Over a Communication Channel" by Ji Zhang et al., filed on Oct. 10, 1997 (U.S. application Ser. No. 08/947,480), which is incorporated by reference herein.

When digital video data is compressed, the encoder assumes a particular bit rate profile, whether it is constant bit rate (CBR) or a variable bit rate (VBR). The word "profile" refers to the fact that bit rate may not be constant, but variable under certain constraints, such as peak bit rate, average bit rate, minimum bit rate, etc. For example, a constant bit rate stream at 4 Mbps does not have the same bit rate profile as a variable bit rate stream at an average of 4 Mbps but has larger maximum bit rate and smaller minimum bit rate, respectively. Even though a compressed bitstream typically comprises a combination, called a multiplex, of compressed audio, video and auxiliary data bitstreams, the format conversion and embedding processes described herein primarily refer to procedures applied on compressed video data. Although not detailed, it is understood that any compressed audio and auxiliary data, such as compressed audio and auxiliary data related to the output of the embedded compressed video data, may also be embedded as described herein.

As shown by FIG. 5A, a first embodiment for the network device 382 comprises: a remultiplexer 400, four input lines 402, 404, 406 and 408, a scrambler 410 and a transmitter 412. While the present invention will now be described as an apparatus composed of units, those skilled in the area will recognize that the present invention encompasses a method, process or software having as steps the actions performed by each unit and described below.

The plurality of input lines 402, 404, 406 and 408 into the network device 382 receive compressed bitstreams from a variety of sources using suitable receiving components. For example, the line 402 is coupled to a satellite receiver that receives compressed video data from a satellite based communication system. The line 404 is coupled to a network interface that receives compressed video data from an Internet network including a series of ATM based routers which route the compressed video data to the network device 382. The line 406 is coupled to a receiver that receives compressed video data from a terrestrial source and the receiver may also include a suitable RF demodulation and descrambling facilities. The line 408 is coupled to a network interface that receives compressed video data from an Internet network using IP protocol that routes a compressed video bitstream from a video streaming server to the network device 382.

The plurality of input lines 402, 404, 406 and 408 provide multiple compressed digital video bitstreams to the remultiplexer 400. The remultiplexer 400 embeds compressed video data received from the input lines 402, 404, 406 and 408 into a transmission bitstream 419 having a compressed format and including compressed video data corresponding to the compressed video programs received on input lines 402, 404, 406 and 408. In one embodiment, one of the compressed bitstreams received from the input lines 402, 404, 406 and 408 is used as the transmission bitstream 419. In another embodiment, one of the processors 412 produces the transmission bitstream 419. In addition, one or more of the processors (412a–d) within the network device 382 may change the format of any compressed bitstreams received from the input lines 402, 404, 406 and 408 to comply with a target receiver/decoder.

The remultiplexer 400 comprises a number of processing portions each comprising an input buffer 410, a processor 412 and an output buffer 414. The input buffers 410a–d each temporarily store compressed video data received, respectively, by the input lines 402, 404, 406 and 408 until the corresponding processors 412a–d can process the compressed video data. Each processor 412 is coupled to one of the input buffers 410 and embeds compressed video data received from its corresponding input buffer 410 into the compressed transmission bitstream 419. In addition, the processors 412a–d may change the format of any compressed bitstreams it receives as will be described in further detail below in FIG. 5B. The output of the processors 412a–d are each coupled to one of the output buffers 414a–d that temporarily store the video data produced by its corresponding processor 412 before selection by scheduler 416.

The scheduler 416 has four inputs that are coupled to the output buffers 414. The scheduler 416 selectively combines the embedded bitstreams produced by the processors 412 into the compressed transmission bitstream 419 and may insert any headers, stuffing bits, filler packets as appropriate. In one embodiment, the scheduler 416 selectively combines the compressed video data produced by the processors 412 according to the relative size of the compressed video data. For example, the relative bit rate allocation of the compressed video data output by the processors 412 may be 4:2:2:1 for the processors 412a, 412b, 412c and 412d respectively. For embedding compressed video data in constant sized 188 byte transport packets (as described in further detail below) based on this ratio of relative bit rate of compressed video data, the scheduler 416 repetitively selects and embeds into the compressed transmission bitstream 419 according to the following order: a first packet from the processor 412a, a first packet from the processor 412b, a second packet from the processor 412a, a first packet from the processor 412c, a third packet from the processor 412a, a fourth packet from the processor 412a, a second packet from the processor 412b, a second packet from the processor 412c, and a first packet from the processor 412d. Generally speaking, the scheduler 416 may select and embed compressed video data from the processors 412a–d based on other criteria such as timing information, encoder and/or targeted decoder buffer capacity or any other suitable method as one of skill in the art will appreciate. The output of the scheduler 416 is the transmission bitstream 419 having a compressed format and is coupled to the scrambler 418 that prepares the transmission bitstream 419 for transmission to the target decoder via the transmitter 386. The output of the transmitter 386 forms the output of the network device 382.

Figure 5B:
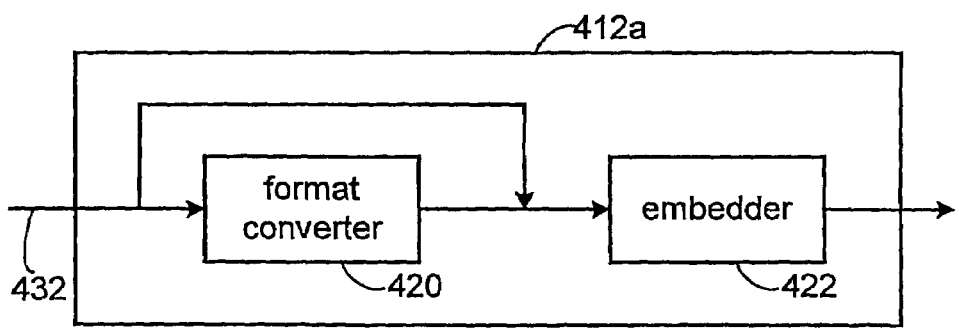
FIG. 5B illustrates the processor of FIG. 5A in more detail in accordance with one embodiment of the present invention.

Referring now to FIG. 5B, the processor 412 of FIG. 5A is shown in more detail in accordance with one embodiment of the present invention. The processor 412 includes a format converter 420 and an embedder portion 422. The embedder portion 422 takes the compressed video data and embeds the compressed data into the transmission bitstream according to the transmission bitstream syntax. The performance of the embedder portion 422 will be discussed in further detail with respect to FIGS. 6A–B.

Figure 5C:
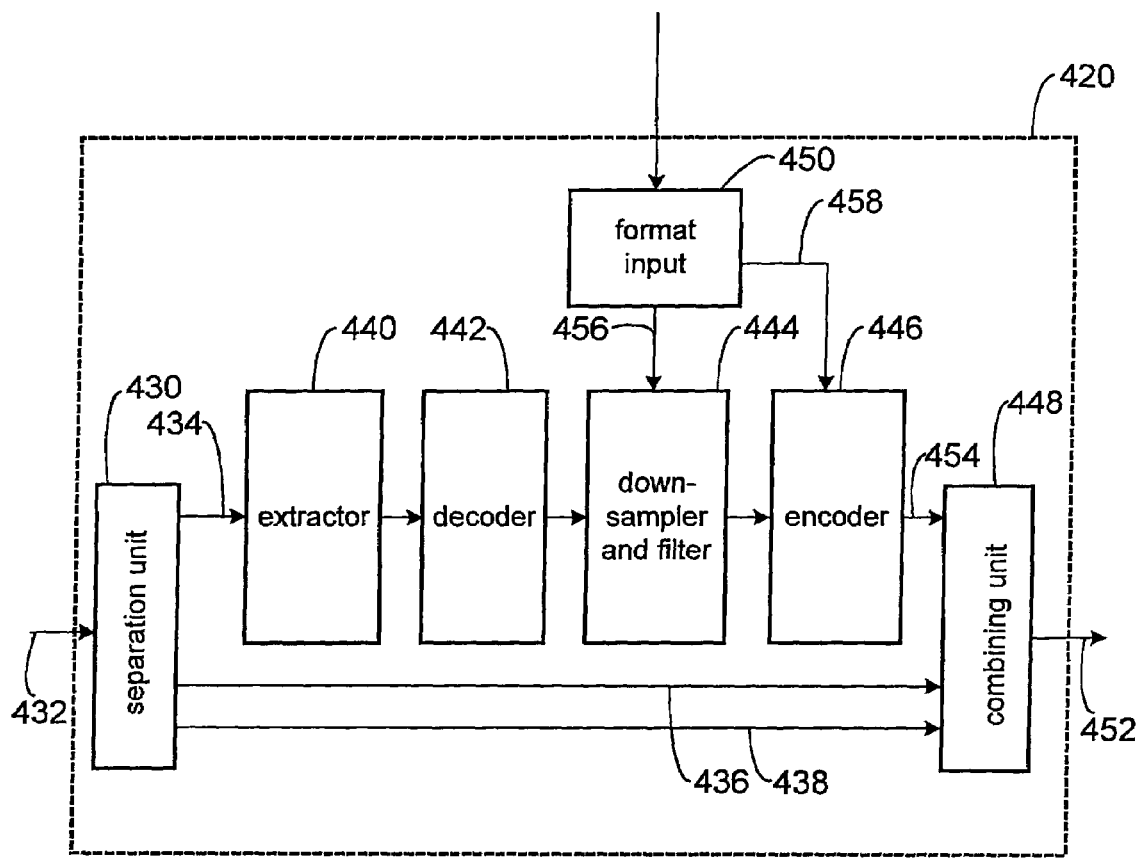
FIG. 5C illustrates the format converter of FIG. 5B in more detail in accordance with one embodiment of the present invention

Referring now to FIG. 5C, the format converter 420 of FIG. 5B is shown in more detail in accordance with one embodiment of the present invention. The format converter 420 includes a separation unit 430, an extractor 440, a decoder 442, a down-sampler/filter 444, an encoder 446 and a combining unit 448. The input of the separation unit 430 is coupled to line 432 to receive an input compressed digital video bitstream. The separation unit 430 preferably demultiplexes the system layer stream, removing filler packets/frames as appropriate, to obtain the video bitstream, the audio bitstream and a data bitstream. The video bitstream is provided on a first output coupled to line 434, the audio bitstream is provided on a second output coupled to line 436, and a data bitstream is provided on a third output coupled to line 438. Those skilled in the art will understand the operation of the separation unit 430, based on the protocol being used for the bitstream.

The input of the extractor 440 is coupled to line 434 to receive the video signal from the separation unit 420. The extractor 440 parses all timing, programming and other auxiliary information, and removes all stuffing data bits as appropriate. The extractor 402 also performs necessary extraction of the payload from the transport packets before passing the data to the decoder 442 and encoder 446 for resolution conversion. This parsing step produces a number of streams that in turn need to be decoded. The decoder 442 converts the compressed video stream to provide an uncompressed video stream. In an MPEG specific embodiment, three MPEG streams are produced, one for transform coefficients, one for motion vectors, and a final one for auxiliary information bits. The decoder 442 then decodes each respective MPEG stream with a suitable decoder, such as one capable of variable length decoding.

The output of the decoder 442 is provided to the image down-sampler and filter 444. The down-sampler and filter 444 is optionally used to alter the uncompressed video data in order to change the compression bit rate that tailors the bit rate of the transmission bitstream 419. The output of the down-sampler and filter 444 is coupled to an input of the encoder 446. The encoder 446 codes the video data back into a compressed format suitable for decompression by the target decoder. In one embodiment, this is accomplished by software stored in the format converter 420 that allows the video data to be converted to any public or proprietary format. The particular compression format used may be determined by a control signal from a format input 450.

The format input 450 connects to both the down-sampler/filter 444 and the encoder 446 and specifies the format to be used for encoding. The format input 450 is configured to receive a signal from a second network device downstream of the network device 382. In one embodiment, the format to be used is typically determined by the target decoder and communicated to the format input 450, either through knowledge of the static decompression capabilities of the target decoder or through an initiation handshake. By way of example, for both ATM and IP networks, an agreement is made between the user requesting the connection and the network device. Information in the connection agreement may include the bit rate capacity of the output channel (to be provided to the down-sampler/filter 444), the quality of service, and the decompression capability of the target decoder. The format input 450 is shown diagrammatically in FIG. 5C as being coupled to the down-sampler/filter 444 and encoder 446 by control signal lines 456 and 458 respectively. While the format input 450 has been described as being a discrete device, those skilled in the art will realize that the format input 450 could be software that provides a control signal to the down-sampler/filter 444 and encoder 446.

The format converter 420 may be tailored to decoding and encoding according to a specific compression format. In another MPEG specific embodiment, the encoder 446 performs DCT, motion residual calculation via motion compensation, variable length coding of all the bits, and then outputs a compressed MPEG bitstream on line 454. In this case, the format converter 420 may also include other format specific processing components such as a bitstream multiplexer and transport multiplexer for rebuilding the MPEG-2 bitstream after format conversion. In another specific embodiment, format conversion requires complete decoding and re-encoding processes for a given format, which may be performed by ASIC hardware. Those skilled in the art will recognize from FIG. 5B that the present invention can be applied to bitstreams based on other compression formats, and MPEG-2 is used by way of example.

The combining unit 448 has three inputs that are respectively coupled to lines 454, 436 and 438 to receive the encoded video bitstream, audio bitstream and data bitstream, respectively. The combining unit 448 performs multiplexing of the bitstreams back into a compressed bitstream and may also insert stuffing bits, filler packets, etc., as appropriate. The output of the combining unit 448 is coupled to line 452 and forms the output of the format converter 420. The output of the combining unit 448 provides a signal that is format converted to match the decompression capability of the target decoder that the transmission bitstream 419 is to be sent to.

Having briefly discussed format conversion for the format converter 420 in accordance with one embodiment of the present invention, embedding of compressed data into the transmission bitstream in accordance with one embodiment of the present invention will now be expanded upon.

Figure 6A:
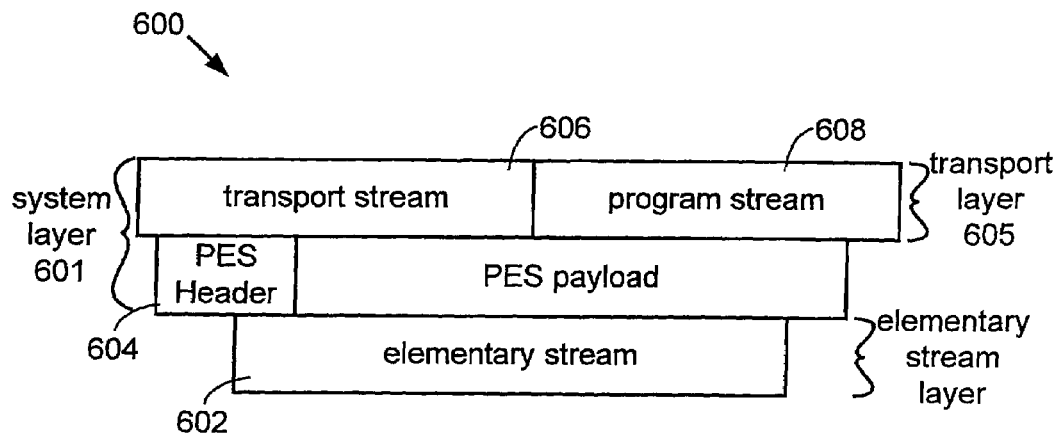
FIG. 6 illustrates a transmission bitstream having MPEG-2 format in accordance with one embodiment of the present invention.

FIG. 6A illustrates a transmission bitstream 600 having an MPEG-2 format in accordance with one embodiment of the present invention. The MPEG-2 compression standard consists of two layers: a system layer 601 an elementary stream layer 602. The system layer 601 comprises two sub layers: a packetized elementary stream (PES) layer 604 and transport layer 605 above the PES layer 604. The transport layer 605 is further divided into a transport stream 606 and a program stream 608. In accordance with one embodiment of the present invention, compressed data may be embedded in the elementary stream layer 602, the PES layer 604, and/or the transport stream 606. Typically, the compressed data is embedded according to the syntax of each layer as will be described below.

The elementary stream layer 602 contains the coded video data and defines how compressed video (or audio) data signals are sampled, motion compensated, transform coded, quantized and represented by different variable length coding (VLC) tables. The basic structure for the coded picture data is a block which is an 8 pixel by 8 pixel array. Multiple blocks form a macro block, which in turn forms part of a slice. A coded picture consists of multiple slices. Multiple coded pictures form a group of pictures. Such hierarchical layering of data structures allows processing in accordance with the present invention to occur as user_private data field in the picture layer headers. For example, complete re-encoding of a precompressed MPEG-2 bitstream is a process that occurs on the lowest layer. The MPEG-2 syntax also specifies private user data fields within the elementary stream layer 602. The private user data fields may be either of variable length or fixed length. For example, a variable length private user data field is always located before each coded picture (I, P or B picture) in an MPEG-2 bitstream. In one embodiment, compressed video data having a non-MPEG format from another bitstream or program is embedded as a data structure in one or more private user data fields in the elementary stream layer 602. In another embodiment, the compressed video data is packed in one or more private user data fields in the same way as the original elementary stream syntax as generated by an MPEG-2 encoder.

Figure 6B:
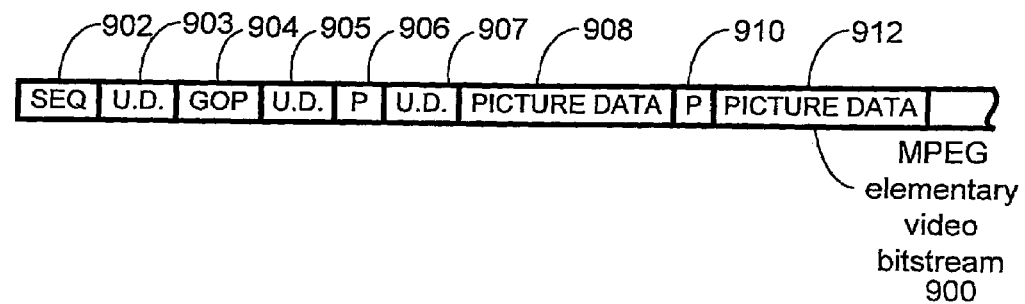
Figure 6B:
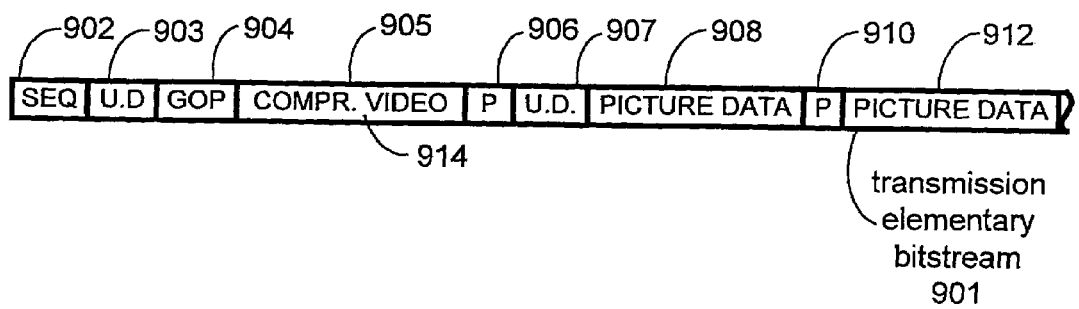

FIG. 6B illustrates the embedding of compressed video data 914 from a first video program received by the network device 382 into an MPEG elementary video bitstream 900 to produce an MPEG transmission elementary bitstream 901 in accordance with a specific embodiment of the present invention. The MPEG elementary video bitstream 900 includes start code indicating processing parameters for the bitstream 900 such as a sequence start code 902, a sequence extension including a user data header 903, a Group of Pictures (GOP) header 904, a user data header 905, a picture header 906, and a picture coding extension that includes a user data extension 907. Picture data 908 follows the picture header 906. The bitstream 900 includes a second picture header 910 preceding picture data 912.

The embedding of the compressed video data into the bitstream 900 includes the insertion of compressed video data 914 within the user data header 905. The MPEG standards allow for a region in the user data header 905 to be used for user-defined information. Preferably, when the compressed video data 914 is inserted within the user data header 905, it is inserted in this space set aside for user defined information. Addition of the compressed video data 914 may be performed by the embedder portion 422 of FIG. 5B.

The compressed video data is embedded in the user data header 905 to avoid any start code emulation problems. Within the MPEG syntax, start codes signal the end of one type of header field and the start of another one. A falsely emulated start code may cause parsing errors as it falsely terminates one header section and starts another header section. Thus, the compressed video data is inserted such that it does not emulate a start code that may incorrectly signal the end of the extension and user data section. For MPEG-2, one start code is a byte-aligned 32 bit word that starts with 0x000001 (binary '0000 0000 0000 0000 0000 0001', which must occur at byte boundaries), followed by another 8 bit value. Not having start code emulated falsely within the user data section allows an MPEG decoder to correctly extract the entire content contained in the user data section. One embodiment of the present invention includes bit scrambling in the user data section such that no start code pattern (0x000001) appears in the user data.

The functions of the fields described above are well known to one of skill in the art and are described by the MPEG standards. The present invention is suitable for use with the MPEG-1 specification, described in ISO/IEC International Standard 11172; "Coding of moving pictures and associated audio for digital storage media up to about 1.5 Mbits/s", November 1993, which is herein incorporated by reference. The present invention is also suitable for use with the MPEG-2 specification, described in ISO/IEC International Standard 13818; "Generic coding of moving pictures and associated audio information", November 1994, which is herein incorporated by reference. The present invention is also suitable for use with the MPEG-4 specification, described in ISO/IEC International Standard; "Coding of moving pictures and associated audio information", March 2000, which is herein incorporated by reference.

The system layer 601 is defined to allow an MPEG-2 decoder (e.g., the audio and video decoders 88 and 90 of FIG. 2) to correctly decode audio and video signals and present the decoded result to a video screen and speakers in a time continuous manner. The system layer 601 also includes provisions that allow multiplexing and separation of audio and video compressed signals as well as multiplexing and separation of different channels of audio and video compressed signals.

The first sublayer in the system layer consists of the PES layer 604. The PES layer 604 defines how the elementary stream layer is encapsulated into variable length packets called PES packets. In addition, the PES layer 604 includes presentation and decoding timestamps for the PES packets.

The transport layer 605 defines how the PES packets are further packetized into fixed sized transport packets, e.g. packets of 188 bytes to produce a transport stream. Additional timing information and multiplexing information may be added by the transport layer 605. The transport stream 606 is optimized for use in environments where errors are likely such as storage or transmission in a lossy or noisy media. Applications using the transport stream 606 include Direct Broadcast Service (DBS), digital or wireless cable services, broadband transmission systems, etc. The program stream 608 defines how the PES packets are encapsulated into variable sized packets and may also include additional timing in multiplexing information. The program stream 608 is designated for use in relatively error free environments and is suitable for applications that may involve software processing of system information such as interactive multimedia applications. Applications of program stream 608 include Digital Versatile Disks (DVD) and video servers.

Compressed video data embedded in an MPEG-2 bitstream may be embedded in the elementary stream layer 602 according to elementary stream format (as described above), the PES layer 604 according to PES format, and/or the transport stream 606 according to transport stream format. In the case of PES or transport stream formats, the entire payload may be the private data fields containing the non-MPEG-2 compressed video bitstream. This is allowable since the PES and transport streams provide syntax for identifying the type of entire payload as user private. For a given compression format, the difference between these embedding alternatives may include differences in the timing information, multiplexing information and other information not directly related to the re-encoding process. By way of example, when the compressed video data is embedded in elementary stream format, the bitstream contains no PES, transport or program system layer information.

In one embodiment for embedding compressed video data in the PES layer 604 of an MPEG bitstream, the compressed video data is embedded in the payload of PES packets with each PES packet having a different reserved stream ID. Presentation Time Stamps (PTS) and Decoding Time Stamps (DTS) in the PES header are used to provide synchronization between different PES packets corresponding to the compressed video data included in the same video program. At the multiplexing layer, the PES packets may be multiplexed with related video, audio, and data packets. The PTS and DTS may also be used to provide synchronization between different multiplexed PES packets such as compressed audio corresponding to the video content. For an MPEG program stream, the PACK packet format may be used to multiplex the combined PES packets.

When compressed video data is contained in a PES packet, the compressed video data may be placed inside the PES packet header PES_packet_data_byte field. This avoids any start code emulation problems because the PES header contains a field that defines the length of PES_packet_data_byte field before the user data byte appears in the bitstream. This allows the PES header parser to extract all of the bytes of PES_packet_data_byte without inspecting the content of the data section.

In another embodiment for embedding compressed video data in an MPEG bitstream, compressed video data corresponding to a video program received by the network device 382 may be embedded in the MPEG transport stream 606. In one specific embodiment, the compressed video data is placed in separate transport packets included in the transport stream 606 and each transport packet is identified by a unique packet identification (PID). The compressed video data may be stored as the payload of the transport packets. Association between the corresponding transport packets of a single video program and their video data payload may be achieved through descriptors in the program mapping table (PMT). In one embodiment, the compressed video data descriptors corresponding to an embedded video program may include a descriptor tag, a descriptor length, and a private_data_indicator containing a format identifier. The format identifier is used to specify the coding format of the compressed video data included in the packets. In the PMT table, the compressed video data packet ID is identified with an appropriate descriptor.

In another specific embodiment, compressed video data corresponding to multiple video programs may be embedded in the MPEG transport stream 606. In this case, PMT packets would contain multiple compressed video data PIDs with each PID corresponding to a compressed data from video program and each with an appropriate resolution descriptor. This allows multiple streams of compressed video signals to be re-multiplexed into a single channel and be properly separated upon entering the target decoder/receiver. Using this compressed video data descriptor, a decoder may extract the desired compressed video data and decompress the video data according to the format specified by a descriptor included in the PMT table.

Although the above discussion has focused primarily on embedding compressed video data of one or more formats in various layers of an MPEG-2 transmission bitstream, the present invention is not limited to embedding within a bitstream of any format. In other words, compressed video data embedding in accordance with the present invention may be implemented in any public or proprietary format and any portion therein as one skilled in the art will appreciate.

Figure 7:
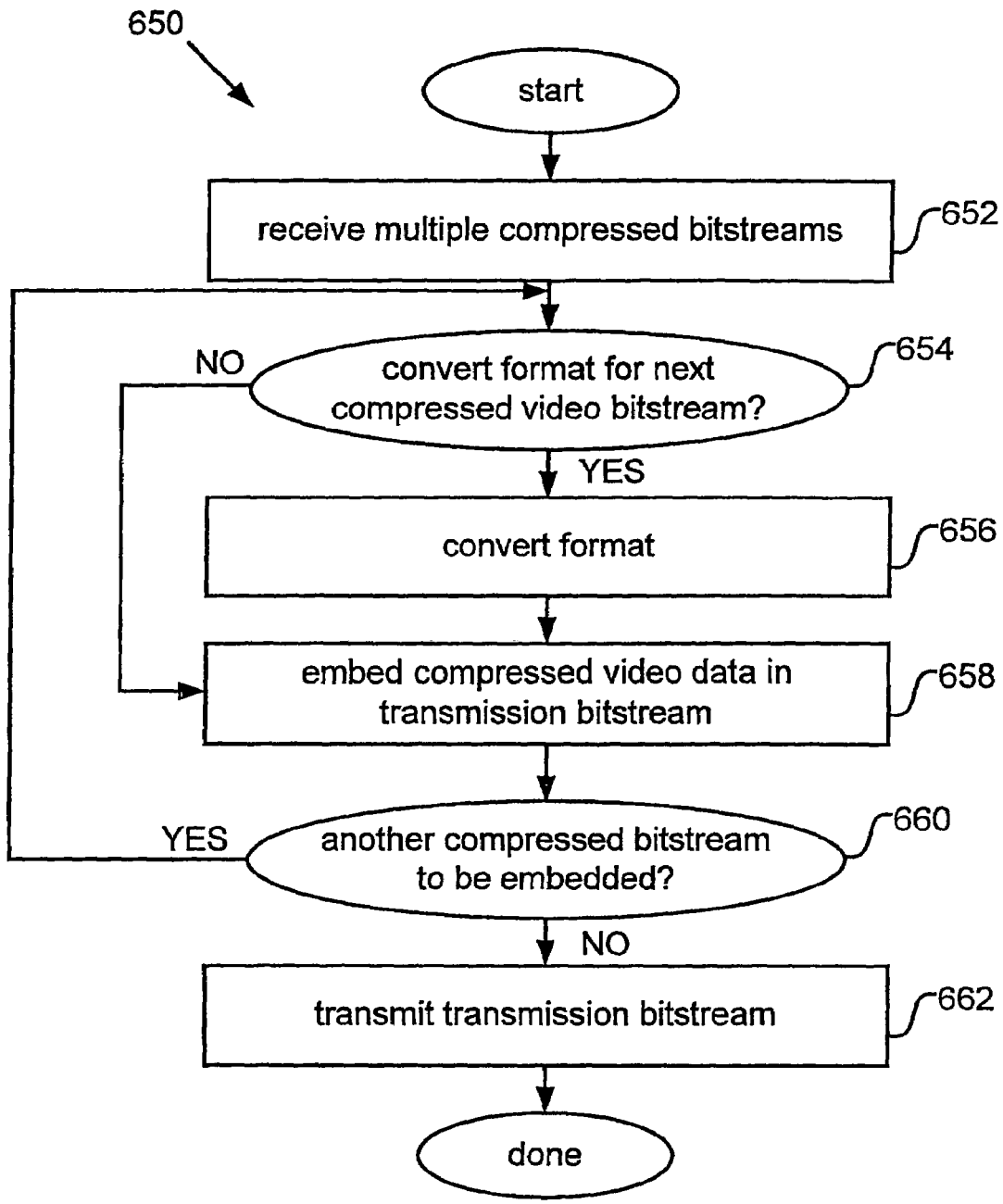
FIG. 7 illustrates a process flow for embedding a first bitstream into a second bitstream and converting the format of one bitstream including video data in the compressed domain in accordance with one embodiment of the present invention.

The network device 382 takes multiple compressed bitstreams and embeds one or more of them into a transmission bitstream. FIG. 7 illustrates a process flow 650 for embedding a first bitstream into a second bitstream and converting the format of compressed video data included in the second bitstream in accordance with one embodiment of the present invention. The process flow 650 may take place in any network device such as the network device 27 of FIG. 1.

Processes in accordance with the present invention may include up to several additional steps not described or illustrated here in order not to obscure the present invention. While down embedding and format conversion will now be described as a method, those skilled in the area will recognize that the present invention encompasses a system or software having units capable of performing the actions as described below.

The process flow 650 begins by receiving multiple compressed bitstreams (652) from one or more sources, e.g., satellite and Internet. Each of the multiple compressed bitstreams include video data having one or more compression formats. For each compressed bitstream to be transmitted, the compression format of the compressed bitstream is first verified against the decompression capability of the target decoder (654). If desirable, the format of the next compressed bitstream is converted according to the decompression capabilities of the target decoder (656). Format conversion may include full or partial decoding and re-encoding of the compressed video data depending the specific compression formats before and after conversion. For example, MPEG-4 to MPEG-2 format conversion may require only partial decoding and re-encoding while Quick-Time to MPEG-2 format conversion may require full decoding and re-encoding. Alternatively, MPEG-2 to H.263 format conversion may require only partial decoding since many of the H.263 DCT values can be derived from the corresponding MPEG-2 DCT values.

Encoding and decoding processes used in format conversion may be any of those known in the art. By way of example, decoding according to MPEG-2 protocol includes receiving compressed video data and processing the compressed video data with VLC decoding, de-quantization, inverse transform coding, and motion compensation. Decoding may occur, for example, upon receiving the compressed MPEG-2 bitstream at a headend or any other suitable network device. Encoding according to MPEG-2 protocol includes receiving raw video data and processing the raw video data with motion compensation, transform coding, quantization and VLC encoding to produce a compressed bitstream.

The process flow 650 may also include bit rate alteration of the transmission bitstream based on the bit rate capacity of the channel between the network device and the target decoder. The bit rate alteration may occur on the compressed video data or uncompressed video data or at any point therebetween while the data is partially encoded or decoded. By way of example, the bit rate alteration may include partial decoding via re-quantization and VLC encoding to reduce redundancy and produce a smaller compressed bitstream. Alternatively, the bit rate alteration may include full decoding and downsampling that takes a high resolution video data and converts it to a low resolution video data. Downsampling is well known to one of skill in the art and any conventional method may be used to change the resolution of the video data. Suitable techniques for downsampling using low resolution information appended in the compressed bitstream are discussed in commonly owned co-pending U.S. patent application entitled "Methods and Apparatus for Bandwidth Scalable Transmission of Compressed Video Data Through Resolution Conversion" by Ji Zhang et al., filed on Jun. 30, 2000 (U.S. application Ser. No. 08/947,480), which is incorporated by reference for all purposes.

The compressed bitstream is then embedded into the transmission bitstream (658). If one of the input compressed bitstreams initially received is not used as the transmission bitstream, either naturally or after format conversion to a suitable transmission bitstream format (one that allows embedding therein), a suitable transmission bitstream may be generated, e.g., according to the MPEG-2 syntax. The above process is then repeated (654, 656 and 658) for each compressed bitstream received and to be embedded (660). Once embedding is complete, the transmission bitstream may then be transmitted onto a channel to the target decoder/receiver as desired (662).

In the above described embodiments, a network device generates the bitstreams for transmission in real-time. Embedding according to present invention may also be done in non-real-time or off-line on prestored bitstreams using general-purpose computers such as PCs or general-purpose workstations. In many applications, particularly in Web-Server based IP streaming, a transmission bitstream including compressed video content of another format is created and stored on a large capacity WebServer. In this case, the transmission bitstream is encoded and stored before streaming. While the transmission bitstream is stored, a general-purpose computer may be used to embed one or more compressed video programs or compressed video bitstreams therein. Thus, the present invention may be performed in non real-time and by general-purpose computers. In one embodiment, embedding done on a general-purpose computer may be done entirely in software—providing for even broader application potential.

Figure 8:
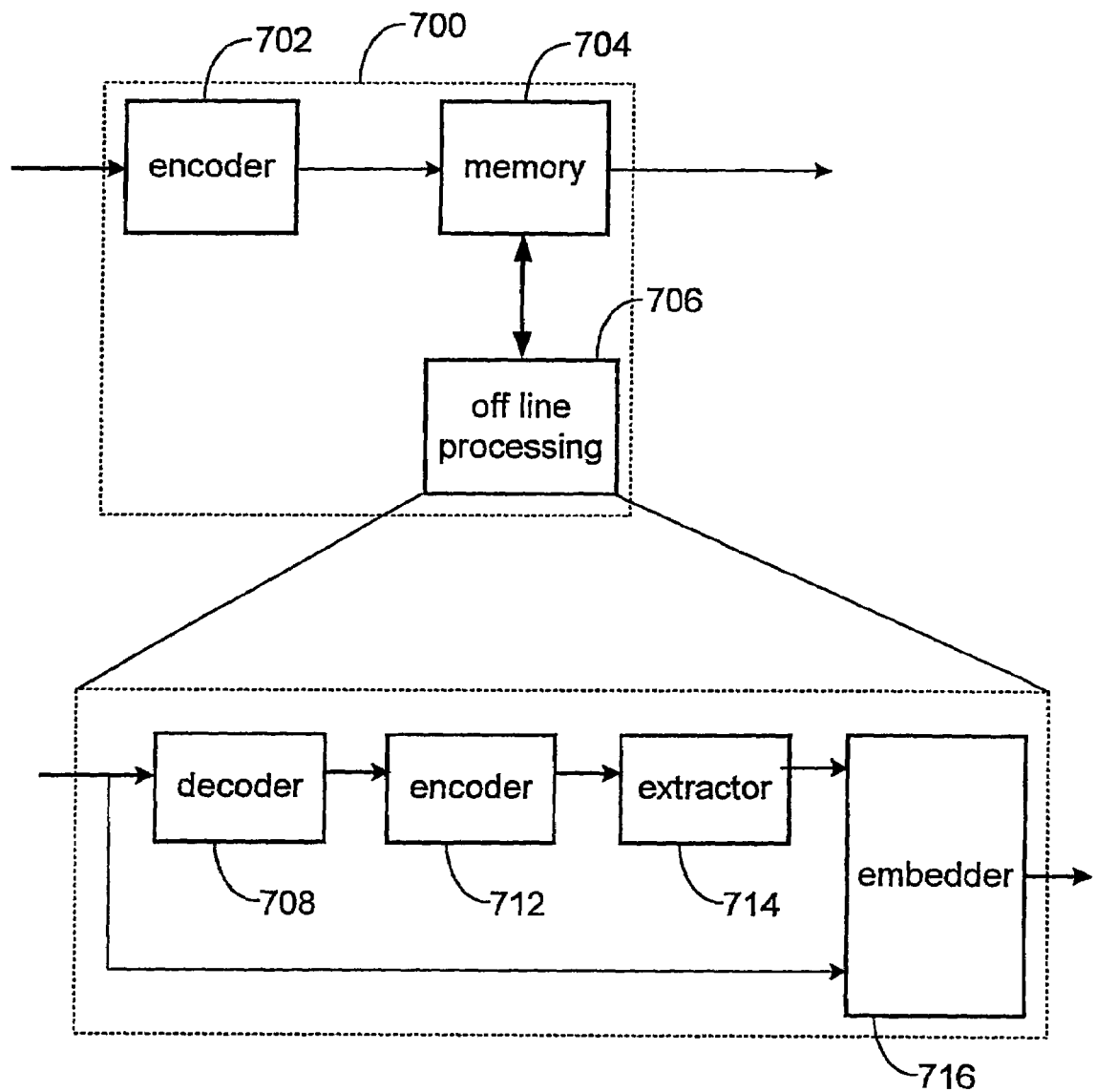
FIG. 8 illustrates a general-purpose computer for non real-time embedding in accordance with one embodiment of the present invention.

FIG. 8 illustrates a general-purpose computer 700 for non real-time embedding in accordance with one embodiment of the present invention, e.g., by encoder 15 of FIG. 1. The computer 700 includes an encoder 702 that receives one or more uncompressed video data streams an outputs corresponding compressed data streams each having a given compression format. The compressed data streams are then stored in memory 704. While the compressed data streams are stored, one or more are retrieved for off-line processing 706. Off-line processing 706 comprises decoding by a decoder 708, encoding by an encoder 712, and extraction of the information required to embed the compressed video data (e.g., extracting the compressed video data from elementary layer information) by an extractor 714. Off-line processing 706 also comprises embedding the compressed video data and other extracted information in a transmission bitstream by an embedder 716 to produce a transmission bitstream including compressed video data. The transmission bitstream is then stored in memory 704. From this point, the modified transmission bitstream may be sent onto a transmission channel or multicast as desired.

The methods of this present invention may be implemented on various systems. For example, the invention may be implemented on network devices such routers and/or switches. In a specific embodiment, the systems of this invention may be specially configured routers such as, for example, specially configured router models 1600, 2500, 2600, 3600, 4500, 4700, 7200, and 7500 available from Cisco Systems, Inc. of San Jose, Calif. In another specific embodiment, the systems of this invention may be specially configured CMTSs such as, for example, specially configured models in the uBR-7200 series of CMTSs available from Cisco Systems. A general architecture for some of these machines will be given below. In an alternative embodiment, the methods of this invention may be implemented on a video streaming server, a cache server, a web server, or a general-purpose network host machine such as a personal computer or workstation. Further, the invention may be at least partially implemented on a card (e.g., an interface card) for a network device or a general-purpose computing device.

Figure 9:
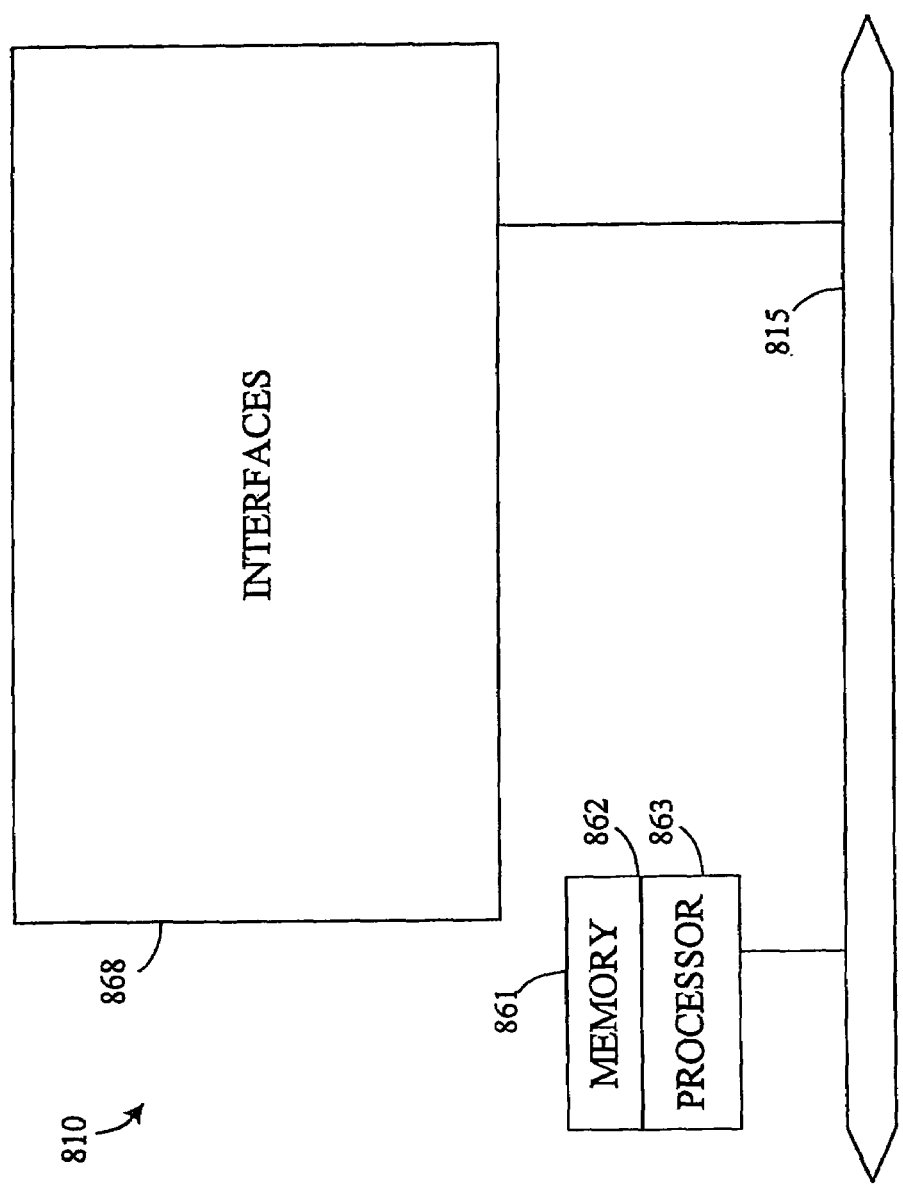
FIG. 9 illustrates a high-level block diagram of an exemplary general-purpose router suitable for implementing the present invention.

Referring now to FIG. 9, a high level block diagram of an exemplary general purpose router 810 suitable for implementing the present invention includes a master central processing unit (CPU) 862, interfaces 868, and a bus 815 (e.g., a PCI bus). When acting under the control of appropriate software or firmware, the CPU 862 is responsible for such router tasks as routing table computations and network management. It preferably accomplishes all these functions under the control of software including an operating system (e.g., the Internetwork Operating System (IOS®) of Cisco Systems, Inc.) and any appropriate applications software. CPU 862 may include one or more processors 863 such as a processor from the Motorola family of microprocessors or the MIPS family of microprocessors. In an alternative embodiment, processor 863 is specially designed hardware for controlling the operations of router 810. In a preferred embodiment, a memory 861 (such as non-volatile RAM and/or ROM) also forms part of CPU 862. However, there are many different ways in which memory could be coupled to the system.

The interfaces 868 are typically provided as interface cards (sometimes referred to as "line cards"). Generally, they control the sending and receiving of data packets over the network and sometimes support other peripherals used with the router 810. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 862 to efficiently perform routing computations, network diagnostics, security functions, etc.

In one embodiment, the network device 276 shown in FIG. 2B is implemented as a video embedding line card. The line card behaves as video network device without any physical interface. In some cases, it may include an appropriate interface for digital video such as ASI and DHEI. The line card may also include multiple on-board video processors for format conversion. While the video processors perform the typical IP routing functions and decide the network loading, these video processors may also change the format and/or bit rate for each video channel and incoming compressed bitstream dynamically, based on the network loading statistics. In another embodiment, a video processing line card includes a physical interface to twisted pair for xDSL output or a physical interface to coaxial cable for QAM or QPSK output. QAM/QPSK format may be converted into satellite or wireless signal, one-way or two-way.

Although the system shown in FIG. 9 is one specific router of the present invention, it is by no means the only router architecture on which the present invention can be implemented. For example, an architecture having a single processor that handles communications as well as routing computations, etc. would also be acceptable. Further, other types of interfaces and media could also be used with the router.

Regardless of network device's configuration (for cable plants or otherwise), it may employ one or more memories or memory modules (e.g., memory 861) configured to store program instructions for the network operations and other functions of the present invention described herein. The program instructions may specify an operating system and one or more applications, for example. Such memory or memories may also be configured to store data streams, data structures or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

The present invention is suitable for use on a variety of networks such as DSL networks. In this case, one element of the invention is to create a synergy between the embedding of compressed video bitstreams and the use of RADSL to transport compressed video bitstreams, especially the transform coding based (such as MPEG) compressed video bitstream. Yet another application of the present invention is to Asynchronous Transfer Mode (ATM) networks. The present invention also includes the concept of traffic shaping of compressed video and has significant value in some ATM network implementations. Traffic shaping within the ATM networks using compressed video embedding is an enabler of flexibly transport MPEG-2 video, as well as any other types of compressed video streams, over ATM networks. The present invention creates a synergy between the compressed video embedding and the use of ATM networks to transport compressed video bitstream, especially the transform coding based (such as MPEG) compressed video bitstream.

Although the present invention has been discussed primarily with respect to compressed video embedding over a single channel, the embedding and format conversion techniques of the present invention are not limited in this manner. In some applications, such as a satellite transponder, or the analog spectrum of a coaxial, or a wireless channel may be used to carry multiple compressed bitstreams. In these cases, a multiplexing scheme may be used to allow logical sharing of the same channel bandwidth. If all of the bitstreams participating in the multiplexing comply with the compression system layer standard, multiplexing can be achieved within the compression system layer. Otherwise, the bitstream must be multiplexed using different schemes. The need for embedding may arise when the sum of the individual bandwidths for all the compressed streams does not fit into the available channel capacity.

Advantageously, embedding and format conversion according to the present invention improves end-user compressed video data service. Format conversion according to the present invention allows flexible transmission of video content even when the original video data format and available decompression capability are mismatched. In addition, the present invention shifts the complexity of video decompression via increased complexity at the network device and potentially further upstream to the video broadcast server. This scheme allows for simpler end user decoders such as less expensive set-top boxes. For example, this scheme allows any commercially available decoders such as main profile main level (MP@ML) MPEG video decoders to decode any compressed bitstream. Another benefit of the present invention is that it is backward compatible with all existing compression formats such as MPEG-2 encoders and consumer set-tops. Embedding video data according to the present invention may be advantageous for target digital receiver/decoders having multiple format decompression capabilities.

While this invention has been described in terms of several preferred embodiments, there are alterations, permutations, and equivalents which fall within the scope of this invention which have been omitted for brevity's sake. For example, the present invention may be used to perform bandwidth sharing, despite the fact that the available bandwidth from the transmission facility, which includes but is not limited to, xDSL, ATM, wireless channel, is sufficient to send the incoming compressed bitstream. It is therefore intended that the scope of the invention should be determined with reference to the appended claims.

What is claimed is:

1. A network device for providing first compressed video data onto a network, the network device comprising:
   an embedder apparatus having a first embedder portion which embeds first compressed video data having a first compressed format in a transmission bitstream having a second compressed format; and
   a transmitter that transmits the transmission bitstream having the second compressed format, the transmission bitstream including the first compressed video data having the first compressed format.

2. The network device of claim 1 further comprising a format converter that converts the first compressed video data from a third compressed format to the first compressed format, the format converter including an output electronically coupled to the embedder apparatus.

3. The network device of claim 1 wherein the transmission bitstream includes second compressed video data.

4. The network device of claim 3 wherein the second compressed video data has the second compressed format.

5. The network device of claim 3 wherein the second compressed video data has a third compressed format and the embedder apparatus further comprises a second embedder portion which embeds the second compressed video data in the transmission bitstream.

6. The network device of claim 5 wherein the embedder apparatus further comprises a scheduler which selectively inserts the first compressed video data provided by the first embedder portion and the second compressed video data provided by the second embedder portion into the transmission bitstream.

7. The network device of claim 5 wherein the network device is configured to receive the second compressed video data in a fourth compressed format.

8. The network device of claim 7 further comprising a second format converter that converts the format of the second compressed video data from the fourth compressed format, the output of the second format converter coupled to second embedder portion.

9. The network device of claim 8 wherein the second format converter converts the second compressed video data from the fourth compressed format to one of the first and second compressed formats.

10. The network device of claim 8 wherein the second compressed video data comprises a descriptor information field that carries format conversion information that identifies the format of the one of the first and second compressed formats.

11. The network device of claim 1 wherein the first compressed format is one of wavelet, fractal, H.26×, Real Network, QuickTime and MPEG-4.

12. The network device of claim 1 wherein the second compressed format is one of MPEG-1 and MPEG-2.

13. The network device of claim 1 further including a bit rate converter for adapting the bit rate of compressed video data in the transmission bitstream.

14. The network device of claim 1 further including a network interface configured to receive the compressed video data from the network.

15. The network device of claim 14 wherein the network device is configured within a headend.

16. The network device of claim 1 further including a memory for storing the transmission bitstream including the compressed video data having the first compressed format.

17. The network device of claim 16 wherein the network device is configured within a general-purpose computer.

18. A network device for providing compressed video data onto a network, the network device comprising:
   a compressed format converter that receives first compressed video data having a first compressed format and outputs the first compressed video data having a second compressed format; and
   an embedder which receives the first compressed video data and second compressed video data and embeds one of the first compressed video data and second compressed video data into the other of the first compressed video data and second compressed video data; and
   a transmitter configured to transmit the first and second compressed video data.

19. The network device of claim 18 further including a network interface configured to receive the compressed video data from the network.

20. The network device of claim 18 further comprising a second format converter for converting the second compressed video data to a third compressed format.

21. The network device of claim 19 wherein one of the first, second or third compressed formats is MPEG-2.

22. The network device of claim 18 wherein the compressed format converter includes an input that specifies the second compressed format, the input configured to receive a signal from a second network device downstream of the network device.

23. A method for providing compressed video data, the method comprising:
   embedding compressed video data having a first compressed format in a transmission bitstream having a second compressed format; and
   transmitting the transmission bitstream having the second compressed format and containing the compressed video data.

24. The method of claim 23 further comprising converting the compressed video data from a third compressed format to the first compressed format before embedding the compressed video data in the transmission bitstream.

25. The method of claim 24 wherein the converting is performed in real time by a network device having a network interface configured to receive the compressed video data having the third compressed format.

26. The method of claim 24 wherein the converting is performed in non-real time by a general-purpose computer.

27. The method of claim 26 further including storing the transmission bitstream having the second compressed format and containing the compressed video data.

28. The method of claim 23 wherein the transmission bitstream includes second compressed video data and further including transcoding the second compressed video data.

29. The method of claim 28 wherein the compressed video data is embedded in one of the program stream, transport stream, PES layer, and the private data in elementary stream layer of the MPEG-2 bitstream.

30. A network device for transmitting compressed video data, the network device comprising:
- means for receiving the compressed video data in a first compressed format;
- means for converting the compressed video data from the first compressed format to a second compressed format;
- means for embedding the compressed video data having the second compressed format in a transmission bitstream having a third compressed format; and
- means for transmitting the transmission bitstream having the third compressed format, the transmission bitstream including the compressed video data having the second compressed format.

31. A computer readable medium including instructions for method for providing compressed video data, the instructions comprising:
- instructions for embedding compressed video data having a first compressed format in a transmission bitstream having a second compressed format; and
- instructions for transmitting the transmission bitstream having the second compressed format and containing the compressed video data.

32. A network device for providing first compressed video data onto a network, the network device comprising:
- an embedder apparatus having a first embedder portion which embeds first compressed video data having a first video compression format in an MPEG bitstream, wherein the embedder portion embeds the first compressed video data in one of the program stream, transport stream, PES layer, and the private data in elementary stream layer of the MPEG bitstream; and
- a transmitter that transmits the MPEG bitstream, the MPEG bitstream including the first compressed video data having the first compression format.

33. The network device of claim 32 wherein the first compressed format is one of wavelet, fractal, H.26×, Real Network, QuickTime and MPEG-4.

* * * * *